United States Patent [19]
Asada et al.

[11] Patent Number: 5,950,791
[45] Date of Patent: Sep. 14, 1999

[54] DAMPER DISK ASSEMBLY

[75] Inventors: Masaaki Asada; Toshiya Kosumi, both of Neyagawa, Japan

[73] Assignee: Exedy Corporation, Neyagawa, Japan

[21] Appl. No.: 08/962,715

[22] Filed: Nov. 3, 1997

[30]  Foreign Application Priority Data

Nov. 1, 1996  [JP]  Japan .................................. 8-291777

[51] Int. Cl.$^6$ .............................. F16D 13/64; F16D 3/14
[52] U.S. Cl. ........................................ 192/214.1; 464/68
[58] Field of Search ................................ 192/304, 70.17, 192/210.1, 213.12, 213.22, 213.31, 214.1; 464/66, 68

[56]  References Cited

U.S. PATENT DOCUMENTS

| | | | |
|---|---|---|---|
| 3,578,121 | 5/1971 | Maurice | 192/213.31 |
| 4,190,142 | 2/1980 | Berlioux | 192/214.1 |
| 4,741,423 | 5/1988 | Hayen | 192/213.31 |
| 5,059,155 | 10/1991 | Tojima | 192/214.1 X |

*Primary Examiner*—Richard M. Lorence
*Attorney, Agent, or Firm*—Shinjyu An Intellectual Property Firm

[57]  ABSTRACT in a clutch disk assembly, a pair of power output plates (3) and (4) are disposed on either side of a power input plate (2). The power output plates (3) and (4) arc fixed to a flange (27) of a power output hub (5). A torsion spring (6) is disposed between portions of the power input plate (2) and corresponding portions of the power output plates (3) and (4) such that the torsion spring (6) limits relative rotation between the power input plate (2) and power output plates (3) and (4) within a predetermined angular displacement range. A ring-like plate (33) is disposed between a portion of the power input plate (2) and the power output plate (4). The ring-like plate (33) is formed with a connecting part (36) which extends axially outward through a cutout (24) formed in the power output plate (4). A first friction washer (32) is disposed between a portion of the power input plate (2) and the ring-like plate (33). The first friction washer (32) contacts the power input plate (2). A second friction washer (34) is disposed between the ring-like plate (33) and the power output plate (4). The connecting part (36) has a circumferential length that is smaller that a circumferential length of the cutout (24). Therefore, the ring-lie plate (33) may undergo lied relative rotary displacement with respect to the power output plate (4).

3 Claims, 4 Drawing Sheets

DAMPER DISK ASSEMBLY

BACKGROUND OF THE INVENTION

1. Field of the Invention

The present invention relates to a damper disk assembly, particularly a damper disk assembly which dampens a torsional vibration while transmitting a torque.

2. Description of Related Art

A clutch disk assembly is typically used with a flywheel of an automotive vehicle to provide a clutch function and a dampening function. The dampening function of the clutch disk assembly absorbs and dampens torque fluctuations in order to prevent the transmission of the torque fluctuations to a transmission. The dampening function of the clutch disc assembly also serves to reduce or eliminate undesirable noises typically generated in a transmission in response to torque fluctuations. To realize the dampening functions, the clutch disk assembly is provided with a clutch plate and a retaining plate that are fixed to one another, a hub flange, and an elastic member such as a torsion spring placed between the hub flange and the clutch and retaining plates. A hysteresis torque generating mechanism is attached to the clutch and retaining plates and contacts the hub. The hysteresis torque generating mechanism creates hysteresis torque in response to relative rotation between the hub flange and the clutch and retaining plates.

The torque fluctuations are also referred to as vibrations and include an idling vibration, a running vibration, a tipping in-tipping out vibration and resonance vibration which occurs as the RPM of the engine, flywheel and clutch mechanism pass through a resonance frequency of the overall torque generating and torque transmission system. For minute amounts of torsional vibration where there is a small torsional angle between the relatively rotatable parts of the clutch disk assembly, such as the first two types of vibrations mentioned above, it is desirable to reduce the torsional rigidity of the torsional spring as much as possible and to generate a small hysteresis torque corresponding to the rigidity. On the other hand, for a great torsional vibration like the latter above mentioned types of vibration, it is necessary to generate a large hysteresis torque and dampen the torsional vibration.

Typically, a portion of the hysteresis torque generating mechanism disposed between the retaining plate and a portion of the hub flange. The hysteresis torque generating mechanism includes two kinds of friction washers each having a different friction coefficient and a ring-like plate. A first friction washer of the two friction washers, has a small friction coefficient and is in contact with the retaining plate. The second friction washer has a relatively large friction coefficient and is in contact with the portion of the hub flange. The ring-like plate is disposed between the friction washers has a plurality of connecting parts extending through the retaining plate. The connecting parts are inserted in a hole formed in a retaining plate. A small clearance is defined on each side of the connecting part in a circular direction. As a result, when the hub flange and the clutch and retaining plates undergo relative rotation with respect to one another, the ring-like plate may rotate relative to the retaining plate within a range defined by the amount of the clearance between the circumferential holes and the connecting part.

Typically, the ring-like plate rotates along with the friction washer having the large friction coefficient and the friction washer with a small friction coefficient slides on between a ring like plate and a retaining plate, generating a small hysteresis torque. A torsional angle is defined as being the amount of relative rotation between the clutch and retaining plates with respect to the hub flange. The torsion angle is limited by structure of the clutch disk assembly. When the torsional angle becomes larger than the range of the above defined clearance, the ring-like plate rotates with the retaining plate and the friction washer with the large friction coefficient slides between the ring like plate an d a flange, generating a large hysteresis torque.

In the conventional clutch disk assembly, a pin is used to fix the outer circumference of the clutch plate to the outer circumference of the retaining plate. The pin extends through a cutout formed near an outer circumference the hub flange and limits the relative rotation, between the plates and the hub flange.

When the pin or other connecting part is positioned in the outer circumference of a clutch disc assembly member, the radial position elastic members, such as coil springs, must typically be located sufficiently radially inward from the pins. In some clutch applications, it is desirable to maximize the torsion angle. However, in order to increase the possible amount of relative rotation between the hub flange and the clutch and retaining plates, the circumferential length of the elastic members should be increased. It is difficult to extend the length of elastic members that are positioned at a radially inward location. Hence, a clutch disk assembly with radially inwardly located elastic members might not be provided with desirable properties such as a wide range of a torsional angle and a low rigidity. As a result, torsional vibration during driving a car may not be dampened sufficiently.

SUMMARY OF THE INVENTION

One object of the present invention is to provide a damper disk assembly of a clutch disk assembly with properties such as a wide torsional angle and a low rigidity.

In accordance with one aspect of the present invention, a damper disk assembly includes a power input plate and a pair of power output plates disposed on opposite sides of the power input plate. An elastic member is disposed between the power input plate and the power output plates limiting relative rotary displacement between the power input plate and the power output plates within a predetermined angular displacement range. A power output hub is disposed radially within the power input plate and the power output plates, the power output hub being connected to a radially inward portion of each of the output plates. A hysteresis torque generating mechanism is disposed between the output plates and the hub. The hysteresis torque generating mechanism includes a first friction washer disposed between the power input plate and a first of the power output plates. The first friction washer is in contact with the power input plate. A ring like plate is in contact with the first friction washer. A second friction washer is disposed between the ring like plate and the first of the power output plates, the second friction washer having a smaller friction coefficient than the first friction washer. An elastic member is Disposed between the power input plate and a second of the power output plates. The ring like plate has a connecting part extending in an axial direction into an opening formed in the first of the power output plates, the connecting part and the opening define gaps in a circumferential direction such that the connecting part is movable in a circumferential direction relative to the first of the power output plates.

Preferably, the gaps between the connecting part and the openings have a circumferential length of about 1°.

Preferably, the hysteresis torque generating mechanism further includes a third friction washer disposed between the power input plate and a second of the power output plates, the third friction washer being in contact with the power input plate. A second ring like plate is in contact with the third friction washer. A fourth friction washer is disposed between the ring like plate and the second of the power output plates, the fourth friction washer having a smaller friction coefficient than the third friction washer. The second ring like plate has a connecting part extending in an axial direction into an opening formed in the second of the power output plates, the connecting part and the opening define gaps in a circumferential direction such that the connecting part is movable in a circumferential direction relative to the second of the power output plates.

Preferably, the damper disk assembly also includes a pin extending through the power input plate radially inward from the elastic member, wherein the power output plates are formed with at least one circumferentially extending oval opening. The pin extends into the oval opening limiting relative rotary displacement between the power input plate and the power output plates. The oval opening has the opening formed at a radially outward edge thereof.

When the power input plate rotates, torque is transmitted to the pair of power output plates and a power output hub via the elastic member. When a torsional vibration is input to the damper disk assembly, the elastic member is compressed in a circular direction and the power input plate and the power output plates rotate relative to one another.

When minute torsional vibration is input, the ring like plate rotates together with the first friction washer which has a large friction coefficient and the second friction washer slides between the ring like plate and the power output plate, resulting in a small hysteresis torque. When a large torsional vibration is input, a ring like plate rotates together with the power output plate after the connecting part contacts with the edges of the opening and the first friction washer slides on the ring like plate, leading to a large hysteresis torque.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENT

Figure 1:
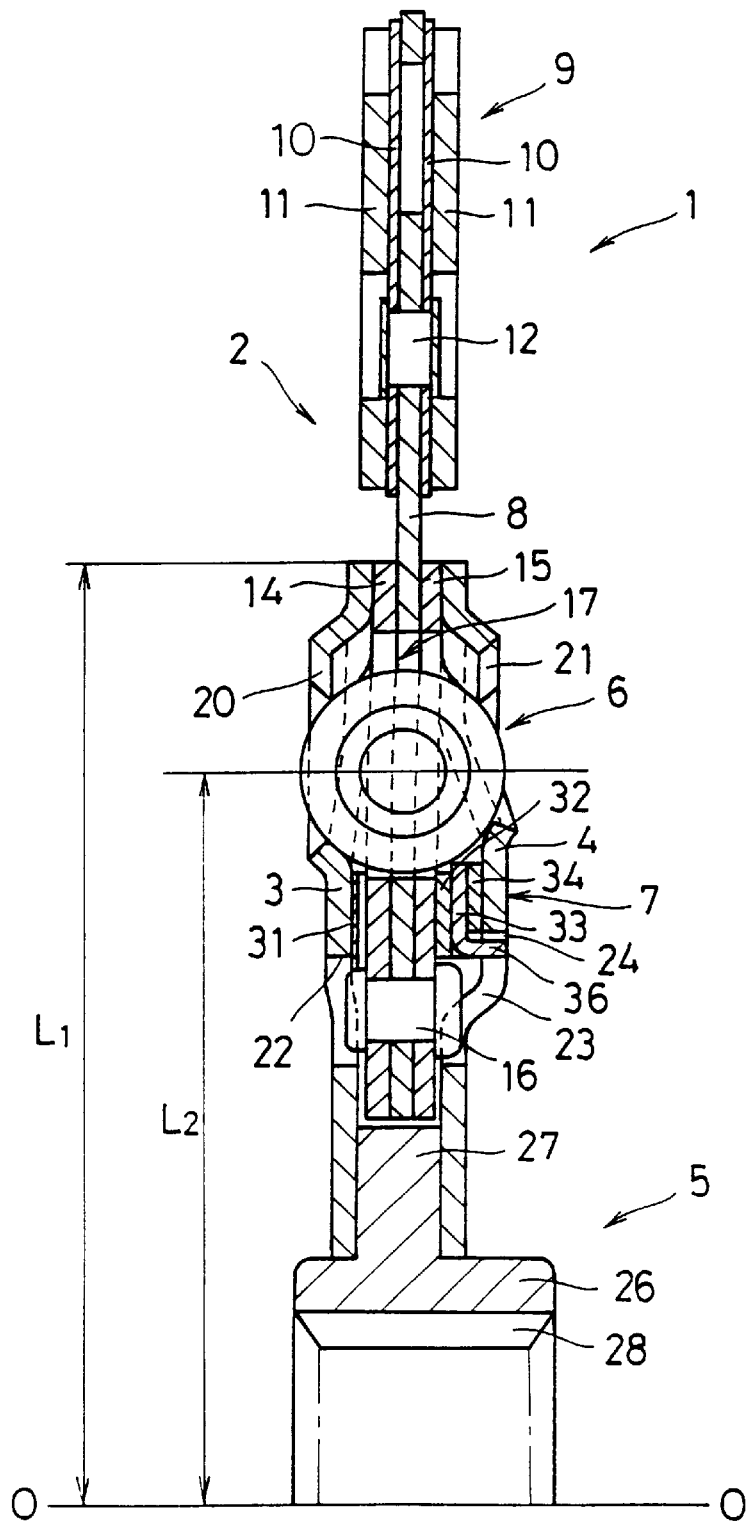
FIG. 1 is a side cross section of a clutch disk assembly in accordance with one embodiment of the present invention.
Figure 2:
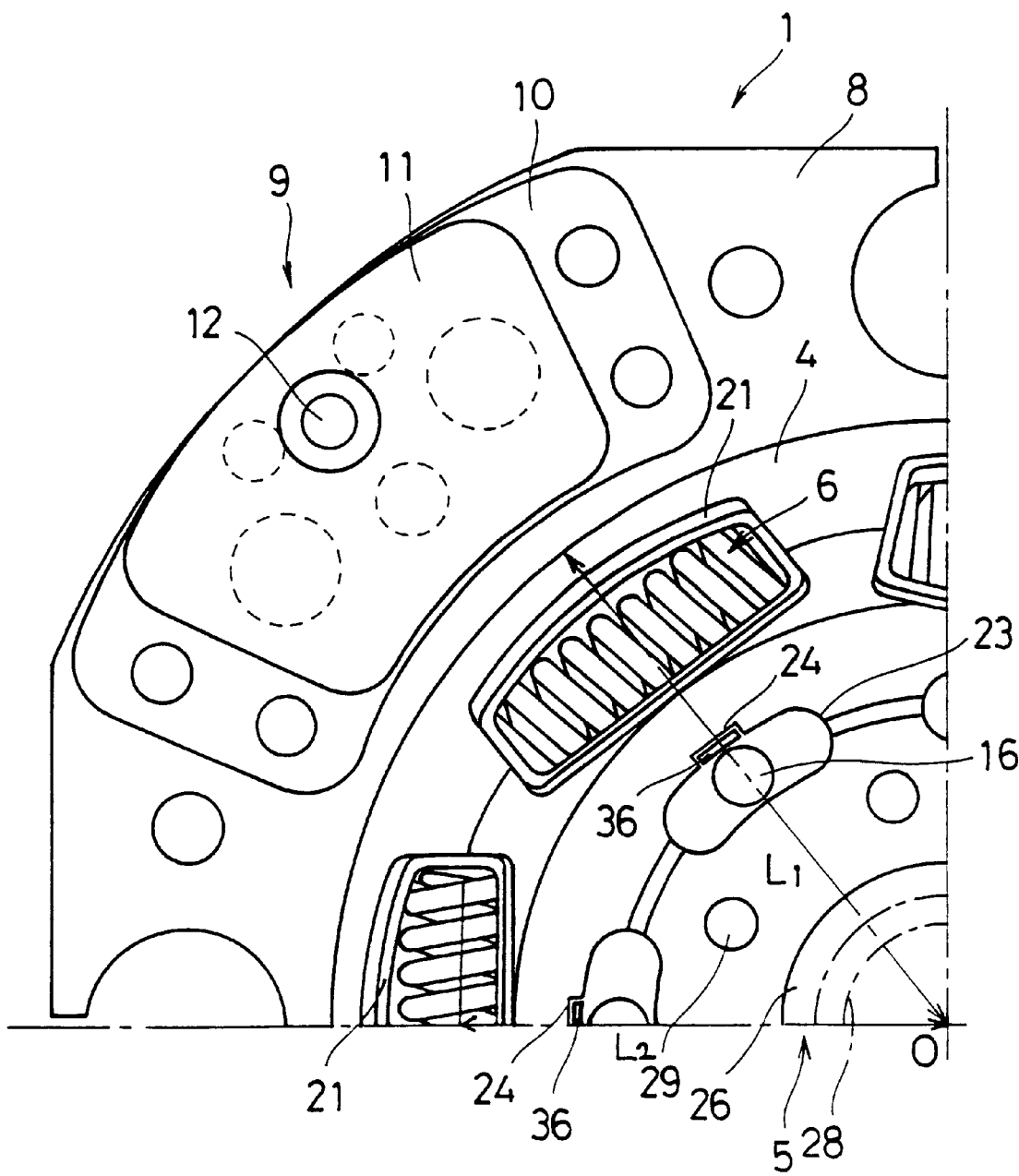
FIG. 2 is an end elevational view of a portion of the clutch disk assembly depicted in FIG. 1.

FIGS. 1 and 2 show a clutch disk assembly 1 used for a clutch device of a car. The clutch disk assembly 1 is placed between an engine (not shown) which is located at the left side of FIG. 1 and a transmission (not shown) which is located at the right side of FIG. 1. The left side of FIG. 1 will hereinafter be referred to as the engine side and the right side of FIG. 1 will be referred to as the transmission side. The clutch disk assembly 1 can be engaged or disengaged to a flywheel (not shown) for transmission of torque. The clutch disk assembly 1 has a dampening function to dampen a torque fluctuation of an engine, in addition to the clutch function. The portions of the clutch disk assembly 1 that provide the dampening function are also referred to as a damper disk assembly.

The clutch disk assembly 1 principally includes a power input plate 2, a pair of power output plates 3 and 4, a power output hub 5, a plurality of torsion springs 6 and a hysteresis torque generating mechanism 7.

The power input plate 2 is a disk like plate, that includes a main plate 8, a clutch connecting part 9 placed at the outer circumference of the main plate 8, and a pair of sub plates 14 and 15 positioned at an inner circumferential portion of the main plate 8. The pair of disk like sub plates 14 and 15 are fixed to opposite sides of the inner circumference of the main plate 8 by a plurality of rivets 16. The main plate 8 and the sub plates 14 and 15 are each formed with a central aperture have generally the same inner diameter. A plurality of internal teeth (not shown) are formed on the inner edge in a radial direction of the main plate 8 and sub plates 14 and 15, extending radially inwardly. A plurality of window holes 17 extending in a circumferential direction are formed in the main plate 8 and sub plates 14 and 15.

A plurality of clutch connecting parts 9 are placed side by side in a circular direction at the outer circumference of the main plate 8. Each clutch connecting part 9 includes a core plate 10 disposed on opposite sides of an outer circumferential portion of the main plate 8 and a friction facing 11 fixed to the core plate 10. The friction facing 11 may be made of, for instance, a sintered ceramic metal. Each of the core plates 10 is fixed to the main plate 8 by a rivet 12.

The power output plates 3 and 4 are disk like parts having generally the same outer diameter. The power output plates 3 and 4 have an inner diameter that is smaller than the inner diameter of the sub plates 14 and 15. The inner circumferential portions of the power output plates 3 and 4 extend radially inwardly on opposite sides of a flange 27 of a power output hub 5 (described below). Further, the inner circumferential portions of the power output plates 3 and 4 are fixed to one another and to the flange 27 by a plurality of rivets 29, as shown in FIG. 2.

The power output plate 3 is disposed on the engine side of the sub plate 14, and the power output plate 4 is disposed on the transmission side of the sub plate 15. The power output plates 3 and 4 have cut and lifted parts 20 and 21, respectively, at a location corresponding to the window hole 17. Cut and lifted parts 20 and 21 are formed by making cuts in a circumferential direction in the plates 3 and 4, then deforming portions of the plates 3 and 4 adjacent to the cuts in radial directions and lifting the deformed portions such that they extend in a generally axial direction to form a spring receiving window, as shown in FIG. 1.

The power output plates 3 and 4 are also formed with holes 22 and 23, respectively, corresponding to a plurality of rivets 16. As shown in FIG. 2, each hole 22 and 23 is formed to extend in a circular direction such that heads of each one of the rivets 16 extend into corresponding holes 22 and 23 and the rivets 16 can undergo circumferential displacement within the confines of the corresponding holes 22 and 23.

The torsion springs 6 (also referred to as an elastic connecting part) are used as a torsional shock absorber and cushions a sudden torque fluctuation such as torque fluctuations from the engine and impact torque during an engine braking. The torsion springs 6 are disposed inside the window holes 17 and between the cut and lifted parts 20 and 21. Each torsion spring 6 has a coil like shape extending long in a circular direction and its both ends in a circular direction is in contact with the side faces of a corresponding one of the window holes 17 and corresponding cut and lifted parts 20 and 21.

Through such a structure, the torsion spring 6 connects the power input plate 2 and the power output plates 3 and 4 so that the power input plate 2 and the power output plates 3 and 4 can rotate relatively within a predetermined range of the angle.

The power output hub 5 includes a cylinder like boss 26 extending in an axial direction and the flange 27 extending radially outward from the boss 26. A spline hole 28 of the hub 5 is configured to engage a shaft (not shown) of the transmission.

The hysteresis torque generating mechanism 7 is configured to generate friction and dampens a torsional vibration when the power input plate 2 and the power output plate 3 and 4 rotate relative to each other compressing the torsion spring 6 is compressed. The generated friction provides a hysteresis torque which minimizes oscillations of the torsion spring 6 and enhances the dampening characteristics of the clutch disc assembly 1.

The hysteresis torque generating mechanism 7 includes a wave spring 31, a first friction washer 32, a ring like plate 33 and the second friction washer 34. The wave spring 31 is positioned adjacent to an inner circumferential side of the torsion spring 6 between the power output plate 3 and the sub plate 14. The wave spring 31 is a ring like plate which is bent repeatedly in a circumferential direction having a wave like shape and defining a spring which can be compressed in and axial direction. The wave spring 31 is compressed in an axial direction and pushes the power output plate 3 and the sub plate 14 in an axial direction. As the result, the power output plate 4 and the sub plate 15 are urged toward each other. Instead of a wave spring, other elastic elements, for example a cone spring may similarly be used.

The first friction washer 32, the ring like plate 33 and the second friction washer 34 are placed in that order from the sub plate 15 side at the inner circumferential side of the torsion spring 6 between the sub plate 15 and the power output plate 4. A portion of the first friction washer 32 on an engine side thereof is in contact with the sub plate 15. Another portion of the first friction washer 32 is in contact with the ring like plate 33, as shown in FIG. 1. The second friction washer 34 is positioned between the ring like plate 33 and the power output plate 4. The first friction washer 32 is made of a friction material which has a higher friction coefficient than that of the second friction washer 34. The ring like plate 33 has an annular portion which extends between both friction washers 32 and 34 and a plurality of connecting parts 36 which extend from a radially inner side of the annular portion of the ring like plate 33. The connecting part 36 extends through a cutout 24 formed on an outer circumferential portion of the hole 23 of the power output plate 4. The cutout 24 extends in a circular direction, as shown in FIG. 2. In a neutral condition, where there is no torsion acting on the clutch disc assembly 1, about 0.5° of clearance is defined on either side of the connecting part 36 within the cutout 24. It should be understood that the cutout 24 may alternatively be an independent aperture formed separately from the hole 23.

In the above described structure, the pair of power output plates 3 and 4 are disposed at opposite sides of the power input plate 2. The inner circumferences of the power output plates 3 and 4 are fixed to the power output hub 5. Hence, it is not necessary to fix the outer circumferences of the power output plates 3 and 4 by a pin or the like. Therefore, the torsion spring 6 can be placed at a more radially outward position compared with the conventional clutch disk. Hence, the overall torsional angle can be increased, compared to prior art configurations.

A ratio of L2/L1 is desired to be about 0.78, wherein L1 is a distance from the center of the clutch disk assembly 1 to the outer circumferential edge of the power output plates 3 and 4, and L2 is a distance from the center O to the center in a radial direction of the torsion spring 6. When the ratio is greater than about 0.70, more desirable results can be obtained. The ratio within the range of 0.75 to 0.80 is more preferable. The above ratio of above 0.70 can be achieved using the configuration of the present invention.

When the clutch connecting part 9 is pressed against a flywheel (not shown), torque is transmitted from the clutch connecting part 9 to the main plate 8. The torque is further transmitted to the power output plates 3 and 4 via the torsion springs 6, and finally is output, to the power output hub 5.

In the present clutch disk assembly 1, the torsion springs 6 are placed more radially outwardly and the torsion springs 6 are longer in a circular direction, compared with the conventional clutch disk. Therefore, it is possible to reduce the rigidity of the torsion spring 6 with the same torsional angle by extending the springs in a circular direction. Hence, properties such as a lower rigidity and a wider torsional angle can be obtained, compared with the conventional one. As the result, noises such as clattering gear teeth and a heavy sounds produced in drive train while driving a car can be reduced effectively.

A torsional property of the clutch disk assembly 1 is described as follows and shown in FIG. 3. For example, the clutch connecting part 9 is fixed and the hub 5 is rotated relative thereto. The ring like plate 33 rotates in a body together with the power output plate 4, since the connecting part 36 is in contact with the cutout 24 of the power output plate 4. Therefore, the first friction washer 32 slides on between the sub plate 15 and the ring like part of the ring like plate 33. In this case, a relatively large hysteresis torque H1 is generated.

Figure 3:
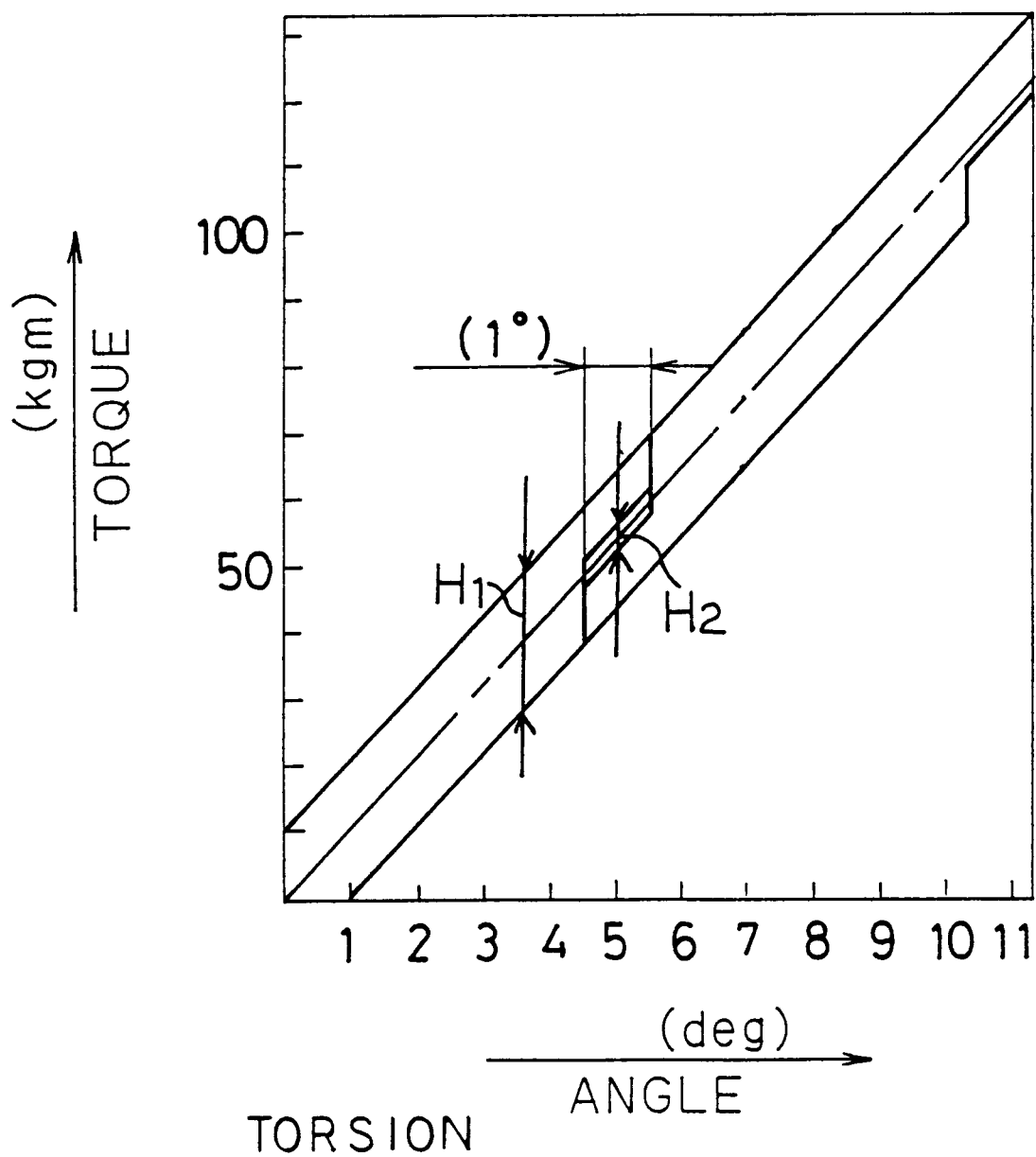
FIG. 3 is a graph showing torsional vibration response characteristics of the clutch disk assembly depicted in FIGS. 1 and 2.

When a minute torsional vibration with an amplitude of within 1° as shown in FIG. 3 is input to the clutch disk assembly 1, the ring like plate 33 is connected to the first friction washer 32 by a friction, while the connecting part 36 reciprocates in a circular direction between both ends of the cutout 24 of the power output plate 4 in a circular direction. The second friction washer 34 slides on between the ring like plate 33 and the power output plate 4. In this case, a small hysteresis torque H2 is generated. By the way, when a minute torsional vibration with a small amplitude is input, a small hysteresis torque H2 is generated, regardless of a torsional angle between the power input plate 2 and the hub 5. As the result, rattle-like vibrations can be dampened effectively when accelerating or reducing speed.

Figure 4:
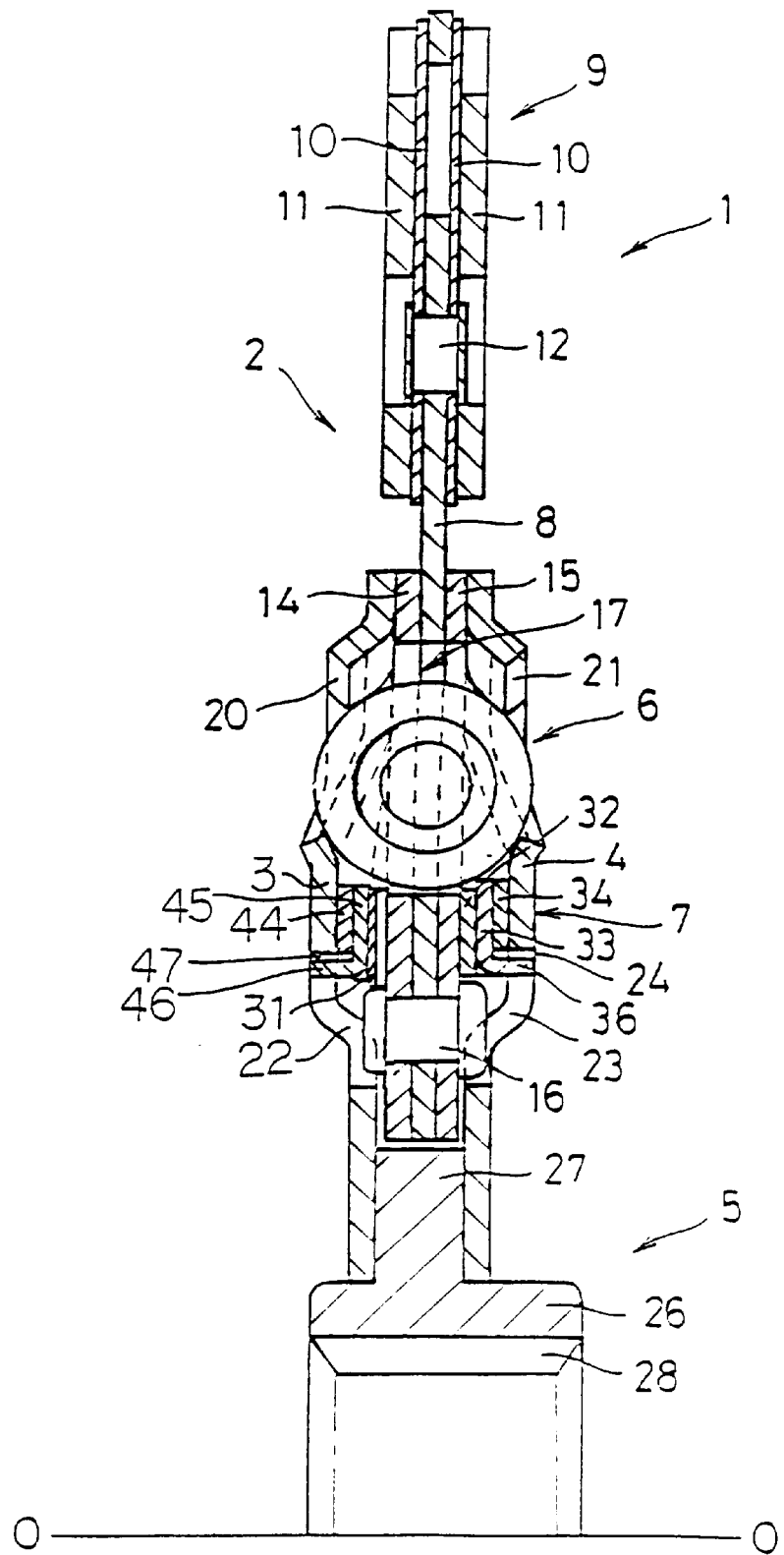
FIG. 4 is a side cross section of a clutch disk assembly in accordance with another embodiment of the present invention.

A clutch disk assembly 1 in accordance with an alternate embodiment is shown in FIG. 4 and is described below. Only those parts of the alternate embodiment which differ from the above described embodiment will be described below, since generally all other portions of the alternate embodiment are the same or similar to the above described embodiment. Between a power output plate 3 and a sub plate 14 at the inner circumferential side of a torsion springs 6, the third friction washer 44, the second ring like plate 45 and a wave spring 31 are placed in that order from the power output plate 3. The third friction washer 44 is disposed between the power output plate 3 and the second ring like plate 45. The third friction washer 44 is made of the same low friction material with that of the second friction washer 34. The second ring like plate 45 has a annular portion which is disposed between the third friction washer 44 and the wave spring 31 and a plurality of connecting parts 46 extend in an axial direction from a radial inner side of the annular part.

The connecting part 46 extends through a cutout 47 which is formed at the outer circumference of a hole 22 of the power output plate 3. The cutout 47 extends in a circular direction. In a neutral condition, about 0.5° of clearance is ensured on either circumferential side of the connection part 46 within the cutout 47. Alternatively, the cutout 47 may be formed separately from the hole 22. In the alternate embodiment, the power output plates 3 and 4 have the same shape as in the embodiment depicted in FIG. 1.

When a minute torsional vibration with an amplitude of within 1° as shown in FIG. 3 is input to the clutch disk assembly 1, the second ring like plate 45 is connected to the wave spring 31 by a friction, while the connecting part 46 reciprocates in a circular direction between both ends of the cutout 47 of the power output plate 3 in a circular direction. The third friction washer 44 slides; on between the second ring like plate 45 and the power output plate 3. In this case, a small hysteresis torque H2 is generated.

A damper disk assembly to which the present invention relates can be used for a torque transmitting device other than a clutch disk assembly.

EFFECT OF THE INVENTION

In a damper disk assembly as set forth in the claim of the present invention, since the inner circumference of power output plates which are placed at both sides of a power input plate are fixed to a power output hub, a pin or etc. which connects both outer circumferences of the power output plates is not necessary and an elastic connecting part can be placed at the most outer circumference of both a power input plate and power output plates. Hence, it is possible to reduce the rigidity of an elastic connecting part with the same torsional angle by extending its length in a circular direction. As the result, the present damper disk assembly has superior properties such as a wide torsional angle and a low rigidity to the conventional one.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A damper disk assembly comprising:

a power input plate;

a pair of power output plates disposed on opposite sides of said power input plate;

a first elastic member disposed between said power input plate and said power output plates limiting relative rotary displacement between said power input plate and said power output plates within a predetermined angular displacement range;

a power output hub disposed radially inward from said power input plate and said power output hub being further disposed between portions of said power output plates, said power output hub being connected to a radially inward portion of each of said power output plates; and a hysteresis torque generating mechanism disposed between said power output plates and said hub, said hysteresis torque generating mechanism including:

a first friction washer disposed between said power input plate and a first of said power output plates, said first friction washer being in contact with said power input plate, a ring like plate being in contact with said first friction washer, a second friction washer disposed between said ring like plate and said first of said power output plates, said second friction washer having a smaller friction coefficient than said first friction washer, a second elastic member disposed between said power input plate and a second of said power output plates, wherein said ring like plate has a connecting part extending in an axial direction into an opening formed in said first of said power output plates, said connecting part and said opening define gaps in a circumferential direction such that said connecting part is movable in a circumferential direction relative to said first of said power output plates, and a pin extending through said power input plate radially inward from said first elastic member, wherein said power output plates are formed with at least one circumferentially extending oval opening, said pin extending into said oval opening limiting relative rotary displacement between said power input plate and said power output plates, said oval opening having said opening formed at a radially outward edge thereof.

2. The damper disk assembly as set forth in claim 1, wherein said gaps between said connecting part and said openings have a circumferential length of about 1°.

3. The damper disk assembly as set forth in claim 1, wherein said hysteresis torque generating mechanism further comprises:

a third friction washer disposed between said power input plate and a second of said power output plates, said third friction washer being in contact with said power input plate, a second ring like plate being in contact with said third friction washer, a fourth friction washer disposed between said ring like plate and said second of said power output plates, said fourth friction washer having a smaller friction coefficient than said third friction washer, and wherein said second ring like plate has a connecting part extending in an axial direction into an opening formed in said second of said power output plates, said connecting part and said opening define gaps in a circumferential direction such that said connecting part is movable in a circumferential direction relative to said second of said power output plates.

\* \* \* \* \*